L. R. HORN.
ENGINE VALVE.
APPLICATION FILED MAR. 3, 1919.
1,312,730.
Patented Aug. 12, 1919.
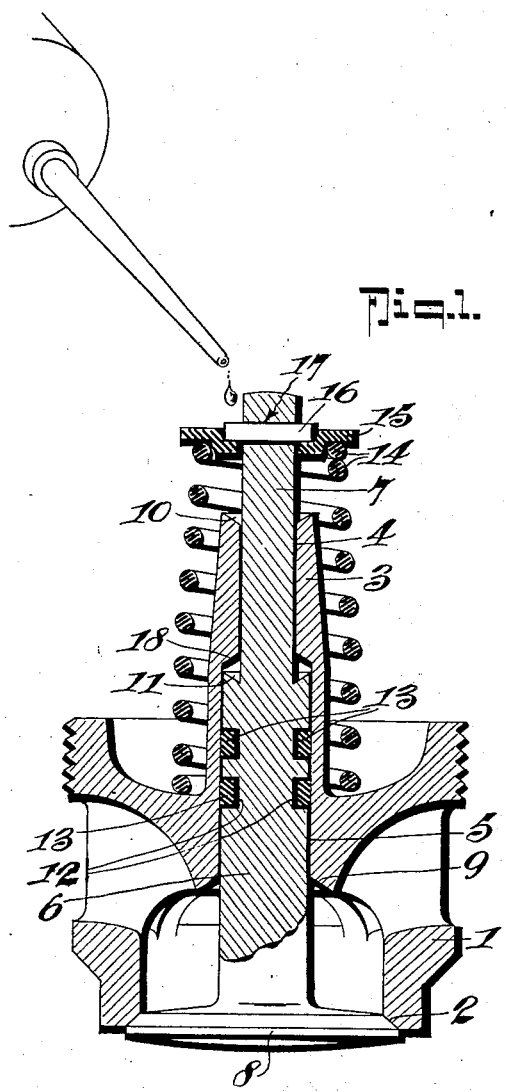
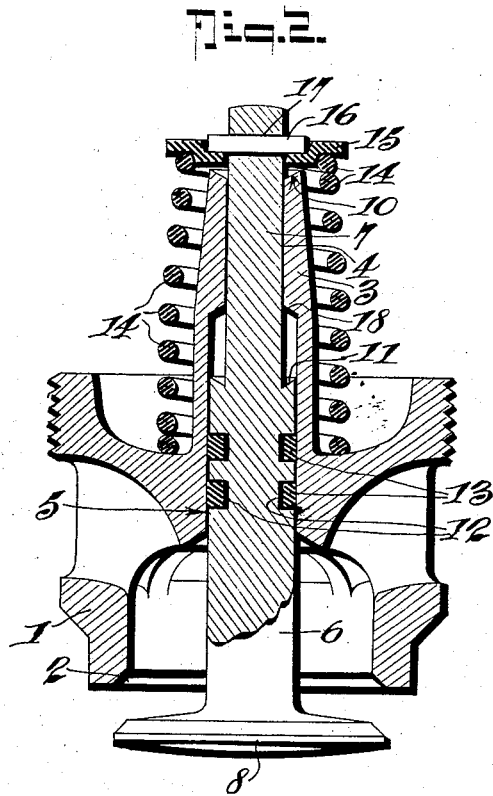
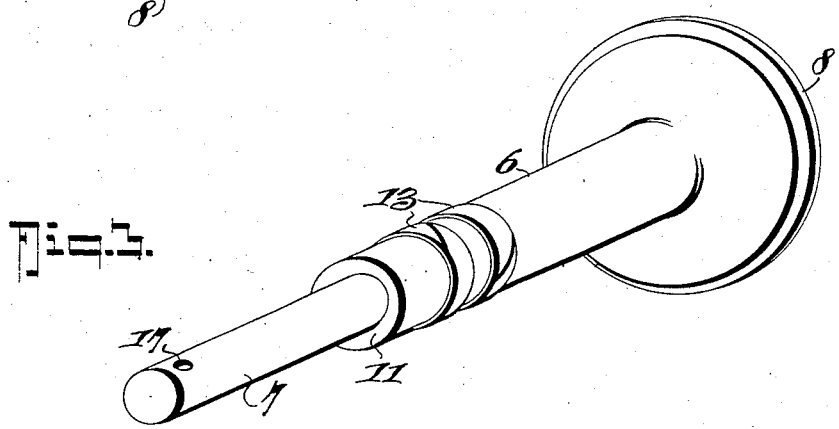
INVENTOR
L. R. Horn.
BY
Fred G. Dieterich
ATTORNEYS

UNITED STATES PATENT OFFICE.

LLOYD R. HORN, OF LITTLE ROCK, ARKANSAS.

ENGINE-VALVE.

1,312,730.   Specification of Letters Patent.   Patented Aug. 12, 1919.

Application filed March 3, 1919.   Serial No. 280,199.

*To all whom it may concern:*

Be it known that I, LLOYD R. HORN, a citizen of the United States, residing at Little Rock, in the county of Pulaski and State of Arkansas, have invented a new and Improved Engine-Valve, of which the following is a specification.

In internal combustion engines it is highly desirable that the valve stems fit their guides or bearings with as little clearance as possible, so as to preclude the passage of air.

After being in use a more or less length of time, the valve stems or their guides (or both) in the ordinary construction of engines, become worn and the stems no longer fit the guides in an air tight manner, thus allowing the passage of air, which, when the inlet valve has the leaky stem, thins the mixture which is drawn into the cylinder and reduces the efficiency of the engine.

When the wear on the valve stems and guides is uneven, one inlet valve may be worn more than another with the consequence that the mixture for the particular cylinder, supplied through that valve, is weakened more than the mixture supplied to the other cylinders, thus causing back fire or premature ignition with consequent knocking of the engine and an unbalanced running of the same.

If the leakage is around the exhaust valve stem, that stem and guide passage soon become fouled by carbon deposits causing the valve stem to bind and prevent the valve from seating properly, thereby reducing the compression of the engine, through valve leakage and consequently interfering with the proper and efficient operation of the engine.

My present invention, therefore, has for its object to provide a valve structure in which the above faults are eliminated and in which means is provided whereby the valve, between the stem and its guide, will be practically proof against leakage, so that the proper mixture will always be had once the carbureter is adjusted, and the full power of the engine can thus be generated.

Again, the invention has for its object to provide means whereby the stem of the valve may be adequately lubricated without the lubricant working down excessively into the valve chamber.

In its general nature, the invention comprises a valve seat or cage member having a stem guide with provisions for directing the lubricant into the guide passage, the stem of the valve having packing rings for sealing it in the guide, gas tight.

The stem is reciprocable in the guide to open and close the valve with regard to its seat, a spring being provided for closing the valve, when released.

The valve stem has an oil recess for collecting the oil and delivering it to the guide walls in which the "piston" portion of the stem is operable.

More specifically, the invention includes those novel details of construction, combination and arrangement of parts, all of which will be first fully described and be specifically pointed out in the appended claim, reference being had to the accompanying drawing, in which:

Figure 1 is a vertical longitudinal section of the valve structure embodying the invention, the valve being in the closed position, the manner of supplying oil to the valve being indicated.

Fig. 2 is a view similar to Fig. 1 with the valve open.

Fig. 3 is a detail perspective view of the valve *per se*.

In the drawing in which like numerals of reference indicate like parts in all of the figures, 1 represents the valve cage which may be of the usual construction, in its general make-up, and which has the valve seat 2 and the guide 3, the latter being bored at 4 to receive the stem 7 of the valve 8 and counterbored at 5 to receive the enlarged or piston portion 6 of the valve stem.

The guide 3, at its entrant end, is beveled as at 9 for a purpose presently to appear and the upper end of the guide is countersunk, as at 10, to form an oil collecting pocket.

The enlarged portion 6 of the valve stem, where it joins with the reduced portion 7, is provided with a recess 11 to collect the oil that feeds down around the stem portion 7 and tends to restrain the oil from too free passage around the enlarged portion 6 of the stem.

12 designates packing grooves on the stem portion 6, in which split metallic packing rings 13 of the piston type are located to seal the passage between the guide 3 and stem 6 against air leakage.

14 is the usual valve closing spring, 15 the cupped washer against which the spring bears and, in the cup of which, the pin 16 is located, the pin 16 passing through an aperture 17 in the stem 7, in the usual way.

In operation, the valve is lubricated by squirting oil from a cone (see Fig. 1) into the cup washer 15, from which the oil gravitates down the stem 7, some of the oil working into the guide 3, where it is collected in the pocket formed between the recess 11 of the stem and the shoulder 18 of the guide.

The provision of the beveled mouth 9 of the guide enables the valve stem with the packing rings to be pushed up into place, the beveled entrance 9 serving to compress the rings 13, as the stem is shoved up into position, thereby eliminating the use of a packing ring compressor.

The operation of the valve and its uses, together with its advantages will be clear to those skilled in the art, without further description, and I desire to call attention to the fact that, while in other types of valves now in common use where the valve stems become worn, it is necessary to purchase new valves with over-sized stems and these are frequently hard to get, or the valve guide must be bushed to take up the wear and this is an expensive and very troublesome procedure, which is avoided by the use of valves embodying my invention.

Having thus described my invention, what I claim is:

In gas engine valves, the combination with the cage having a valve seat and a stem guide, said stem guide having a bore of a plurality of diameters, a valve coöperative with said seat and having a stem of a plurality of diameters coöperating with said guide to provide an oil pocket, the entrance to said guide having a beveled or flared mouth to constitute an oil receiver, metallic expansion packing rings carried by said valve stem, said valve stem projecting through said guide, a spring for closing said valve, and a cup washer on said valve stem against which said spring bears, said cup washer being adapted to receive lubricant and deliver the same around the valve stem, whereby it may be fed into the valve guide, substantially as shown and described.

LLOYD R. HORN.